United States Patent [19]

Hämälä et al.[70][45]

[11] Patent Number: 4,927,613

Date of Patent: May 22, 1990

[54] PROCESS FOR REMOVING A CONSTITUENT FROM A HOT GAS STREAM BY EXOTHERMIC IONIC REACTION OF THE CONSTITUENT WITH A REACTANT PROVIDED IN FINE PARTICULATE FORM

[75] Inventors: Sirpa Hämälä, Tampere; Matti Heikkilä, Helsinki; Jouko Laine, Tampere; Kari Kokkonen, Tampere; Timo Kenakkala, Tampere, all of Finland

[73] Assignee: Oy Tampella AB, Tampere, Finland

[21] Appl. No.: 418,818

[22] Filed: Oct. 4, 1989

Related U.S. Application Data

[63] Continuation of Ser. No. 191,973, May 9, 1988, abandoned.

[30] Foreign Application Priority Data

May 11, 1987 [FI] Finland .................................. 872072

[51] Int. Cl.⁵ .............................................. B01J 8/00
[52] U.S. Cl. ........................................ 423/244; 55/73; 55/90; 423/242
[58] Field of Search ............... 55/73, 84, 90; 423/242, 423/244

[56] References Cited

U.S. PATENT DOCUMENTS

| 3,520,662 | 7/1970 | Marks | 423/242 R |
| 3,864,485 | 2/1975 | Horsley et al. | 55/73 |
| 3,906,078 | 9/1975 | Hausberg et al. | 423/242 A |
| 3,969,482 | 7/1976 | Teller | 423/244 A |
| 4,345,916 | 8/1982 | Richards et al. | 55/94 |
| 4,416,861 | 11/1983 | deVries | 55/94 |
| 4,469,493 | 9/1984 | Tuovinen et al. | 423/242 R |
| 4,753,785 | 1/1988 | Kisters | 423/244 A |
| 4,788,047 | 11/1988 | Hamala et al. | 423/284 |

FOREIGN PATENT DOCUMENTS 3431835 3/1986 Fed. Rep. of Germany ...... 423/242

Primary Examiner—Bernard Nozick
Attorney, Agent, or Firm—Cushman, Darby & Cushman

[57] ABSTRACT

A process for causing gaseous trace element particles to pass from a flowing hot gas into a fine particulate material by means of water. A mixture of the hot gas and water drops is caused to flow substantially upwards at such a velocity that the water drops remain in the gas flow and for a period long enough for most of the mass of the water drops to evaporate in order to cool the gas and to increase its relative humidity. After the gases have reached their wet temperature, they are brought into a turbulent state in order to cause the dust particles and the water drops which have decreased through evaporation to impinge against each other in order to produce in the aqueous film which covers the dust particles an exothermal ion reaction between the gaseous water-soluble trace element particles and the fine particles. Thereafter, the mixture is caused to flow further in order to evaporate the remaining water by means of the heat of reaction so that a dry end product is obtained.

16 Claims, 3 Drawing Sheets

PROCESS FOR REMOVING A CONSTITUENT FROM A HOT GAS STREAM BY EXOTHERMIC IONIC REACTION OF THE CONSTITUENT WITH A REACTANT PROVIDED IN FINE PARTICULATE FORM

This is a continuation of application No. 07/191,97, filed May 9, 1988, which was abandoned upon the filing thereof.

BACKGROUND OF THE INVENTION

The present invention relates to a process for causing gaseous trace elements, usually impurities, to pass from a flowing hot gas, such as industrial flue gases, into a dust by means of water.

Industrial gases, and specifically so-called flue gases, often contain gaseous trace element particles which, for one reason or another, usually for reasons of environmental protection, must be removed from the gases. Impurities can be removed from such gases by means of various processes and devices which have been described in the literature of the field. The processes are based on the physical or chemical absorption and adsorption of the trace element particles involved, by a liquid, a solid or a slurry. Typical examples of such processes include the absorption of hydrogen chloride, sulfur dioxide, sulfur trioxide and nitrogen oxides, present in flue gases, by alkaline compounds of calcium, magnesium, sodium or ammonium, and the adsorption of solvent vapors by, for example, activated carbon. Although the mechanisms of the phenomena have been studied in great detail in theory, the large gas amounts to be treated and often the weak driving force due to low concentrations have complicated the practical designing of apparatus and processes. This has resulted in several different known practical solutions to the problem.

In the known apparatuses in which gas is absorbed directly into a solid, the chemical efficiency of the absorption is in general rather low. When, for example, sulfur dioxide is absorbed into pulverous calcium oxide from the flue gases of power plants, the absorption rate is in general approximately 30%. This is due to the fact that diffusion on the reacting interface between the phases is, depending on the physical states, slow. Improvement of absorption for its part would quickly increase to unreasonable levels the size of the apparatus or the losses of pressure, or would otherwise require impracticable conditions.

In apparatuses in which the absorption takes place in the presence of a liquid phase, various deposits easily form, or the treatment, outside the actual absorption apparatus, of the liquids emerging from the apparatus requires complicated systems or presupposes a suitable existing integrated process. It also easily occurs that the liquids flow out of the absorption apparatus in an uncontrolled manner, causing various operational disturbances. If liquid is added in ample amounts, or if the liquid phase is continuous, the temperature of the hot gases falls to the wet temperature or below it, whereupon, in order to eliminate the risk of corrosion or clogging of the post-absorption gas-treatment apparatus, the gas has to be reheated. This implies either energy losses or, if it is carried out using hot gas which contains trace elements, a decrease in the overall rate of absorption.

SUMMARY OF THE INVENTION

The object of the present invention is thus to provide a process for causing gaseous trace element particles to pass from a flowing hot gas into a dust by means of water, in which process the above-mentioned disadvantages have been eliminated, the absorption rate being, nevertheless, high.

It is generally known that inorganic ion reactions are instantaneous and that precisely the reaction velocity, together with diffusion, is a factor which restricts the absorption of trace element particles. Thus it is clear that many problems involved in the absorption can be solved by means of an ion reaction and rapid diffusion. However, the method for implementing the operation is not self-evident, since only a couple of seconds can be used for bringing a large flow of material into a state which enables the above-mentioned ion reactions to occur. The reason for this is that, owing to the large flows of hot gases, the apparatus size would otherwise become unreasonably large. For the reactions and diffusion themselves, only some 2–4 seconds are left.

Now, it has been surprisingly observed that by using finely-dispersed water only at an intermediate stage of the process, and by channeling the flows in a certain manner, it is possible to provide a process in which the phenomena regulating the absorption are very rapid. According to the present invention, this is achieved by causing a mixture of hot gas and water drops to flow substantially upwards at such a velocity that the water drops remain in the gas flow, and for so long a time that most of the mass of the water drops evaporates in order to cool the gas and to increase its relative humidity. Thereafter, the flow is brought into a turbulent state in order to cause the dust particles and the water drops which have been decreased by evaporation to impinge against each other in order to produce in the aqueous film which covers the dust particles an exothermal ion reaction between the gaseous water-soluble trace element particles and the dust particles. Thereafter the mixture is caused to flow further in order to evaporate the remaining water by means of the heat of reaction. By this procedure a dry end product is obtained from which water need no longer be evaporated.

The effect of the process according to the present invention can be enhanced by bringing the flow into a turbulent state several times and by again bringing the water drops and the dust particles to a substantially laminar vertical flow. More gas can be fed separately into the substantially upward flow of gas and water drops.

The substantially upward flow of hot gas and water drops is throttled advantageously at the beginning in order to increase the flow velocity in the initial section of the reaction zone to so high a level that any large drops possibly falling back towards it are broken up into smaller drops which are able to follow along with the flow.

The turbulent flow may be produced by throttling the flow by means of a fixed or movable vertical plate, by means of infrasound or ultrasound, or by suddenly changing the direction of the flow. The effect can be further enhanced by shock-cooling the turbulent flow.

The temperature of the hot gases to be treated is preferably 80–250° C., e.g. 125–180° C. at the time they are fed into the reaction zone. By regulating the flow velocity of the hot gases, the diameter of the water drops is maintained within a range of approximately 30-200 μm, preferably at maximum 70 μm. For this purpose, hot gas is fed into the reaction zone at a velocity of 10-20 m/s, preferably 12-16 m/s. In order to evaporate most of the mass of the water drops, to cool the hot gases, and to increase their relative humidity, the flow velocity of the hot gas and the water drops in the reaction zone is maintained within a range of approximately 3-30 m/s, preferably 4-15 m/s. In this case, preferably approximately 20-100 g of water/m$^3$ of hot gases is fed into the hot gases. The temperature of the feed flow is not critical, but it is preferably at maximum approximately 40 ° C., for example, at maximum, approximately 15 ° C.

BRIEF DESCRIPTION OF THE DRAWINGS

The invention is described below in greater detail with reference to the accompanying drawings, in which.

DETAILED DESCRIPTION

The dust-like (i.e., fine particulate) material used as the absorption material, which may be, for example, calcium carbonate, is fed, dry, into the hot gases. At this time it may decompose thermally; for example, calcium carbonate decomposes into calcium oxide, and it may partly absorb in a known manner the trace element components, e.g. sulfur dioxide, present in the gas.

Hot dust-bearing gases are fed into the lower section of a substantially vertical reaction zone, whereafter finely-dispersed water is fed into the reaction zone. The water is fed in through one or more nozzles so that the three-phase system forms as rapidly as possible a pseudohomogenous system. Hot gases are fed into the reaction zone at such a velocity, 10-20 m/s, e.g. 12-16 m/s, that the water drops cannot fall downward in the reaction zone and that any large, downward-falling water drops possibly formed through agglomeration are broken up, whereupon the thus-formed smaller drops travel upwards together with the gas flow. This is to ensure that the lower section of the reaction zone will not become wet.

Figure 1:
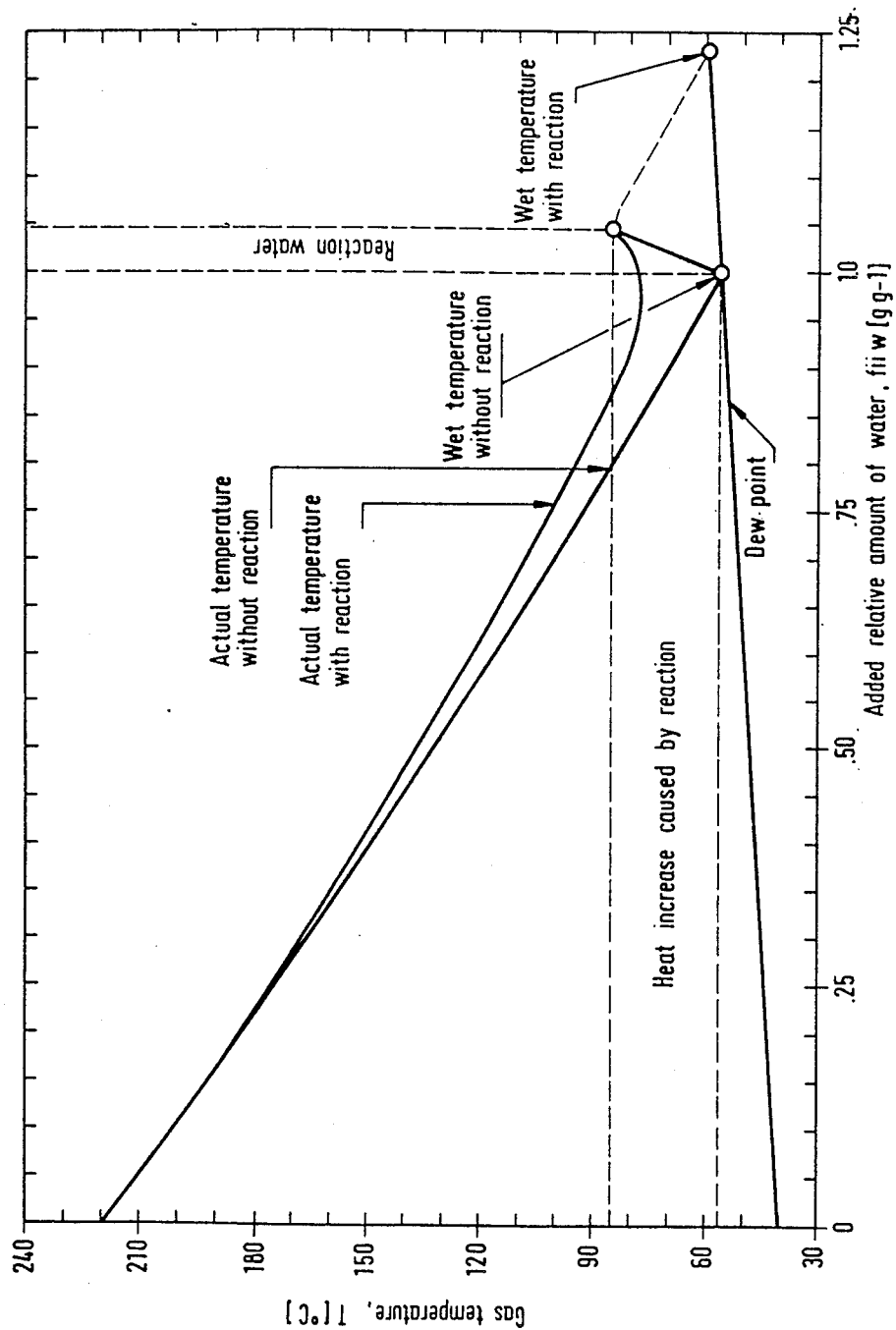
FIG. 1 depicts the dependence of the gas temperature (°C.) on the added relative amount of water (g/g). The lower curve is for a pure gas-water system and the upper curve for a gas-water-lime system, the deviations of the curves being due to absorption reactions.
Figure 2:
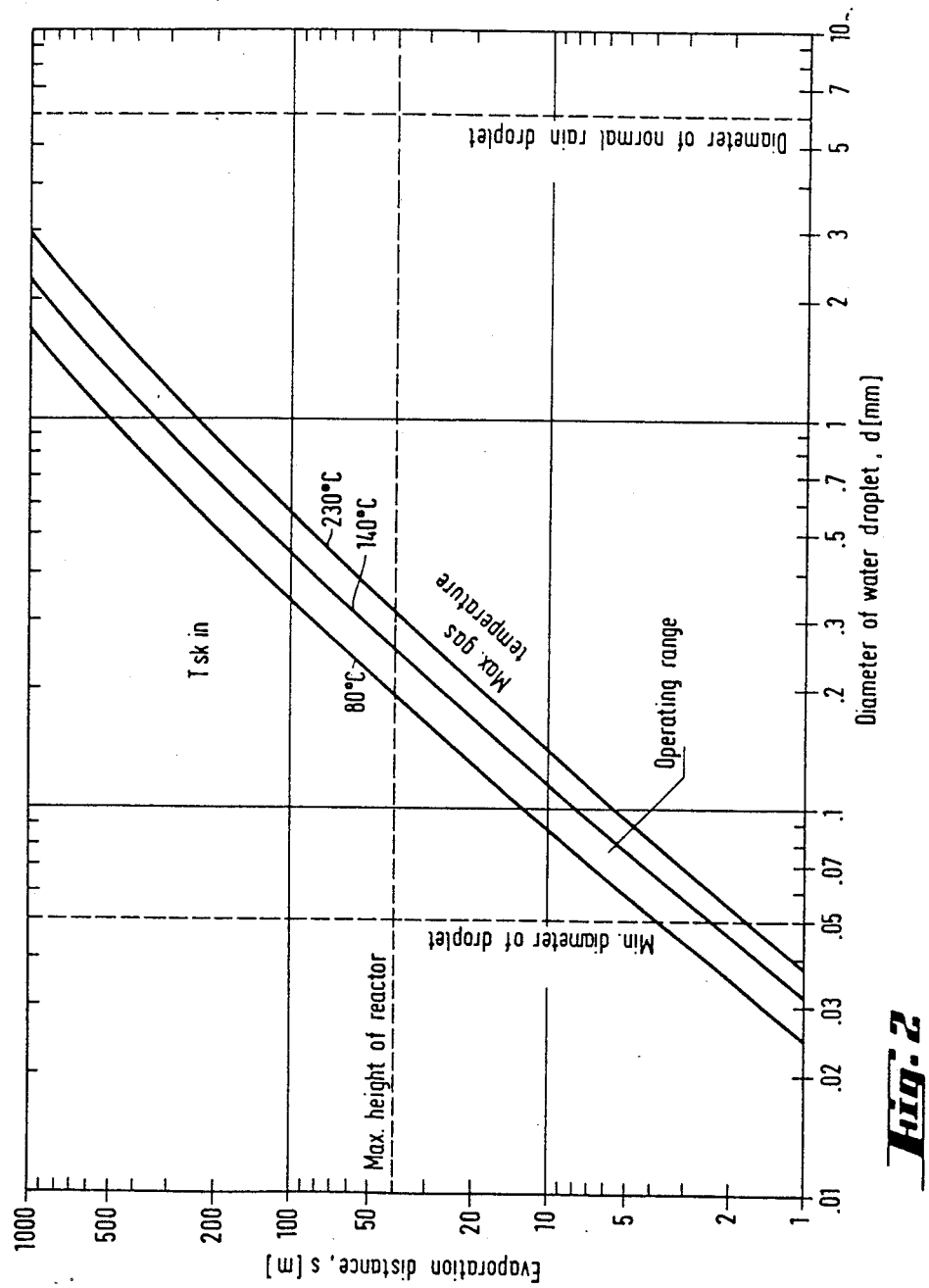
FIG. 2 depicts the dependence of the distance (m) traveled by a water drop during its evaporation on its diameter (mm). As a parameter, the temperature of the feed gas in degrees Celsius. The empty-pipe velocity of the gas and the temperature of the water are constant at the point of spraying. The curve does not take into account the drop size distribution of the water.

The hot gases vaporize water and at the same time the temperature of the gases falls to a level close to the wet temperature (FIG. 1). Since the gases and the water drops flow in parallel, and both the temperature difference between the phases and the driving force of the transfer of material are very low in the vicinity of the wet temperature, effective evaporation can take place only if the drops are very small and their size distribution is small. The diameter of the drops in the reaction zone is maintained preferably within a range of 30-200 μm, e.g. at maximum 70 μm. The velocity of the gases in the reaction zone is maintained preferably within a range of 3-30 m/s, e.g. 4-15 m/s.

It is evident that hot gases and water can be fed into the reaction zone at more than one point, but the number of points for feeding-in hot gases is, however, at least as great as the number of points for feeding-in water.

In the process according to the present invention, it is essential that most of the mass of the water drops fed into the reaction zone is evaporated before the flow is brought into a turbulent state, for example, by changing the direction of the flow or by throttling it, since the dust and liquid present in the gases easily adhere to the wall structures of the reaction zone if the structures deviate from the vertical direction.

When the gas approaches the wet temperature, there forms on the surface of the dust particles a thin liquid film in which both the solids and the trace element particles of the gas dissolve at least to some degree, whereupon the ion reactions start immediately, and, as the driving force again increases, the dissolving continues, and thus the absorption proceeds rapidly, for example so that calcium oxide and sulfur dioxide form calcium sulfite.

The formation of an aqueous film on the surface of the dust particles is substantially dependent on the humidity of the gas, the temperature, and the microturbulence which causes collision of particles. In the process according to the invention, the turbulence is produced by changing the direction of the gas flow, by throttling the gas, or by means of infrasound or ultrasound, and specifically at that point of the reaction zone at which the temperature of the gas is close to its wet temperature. Turbulence can be produced at one point or periodically several times in succession, preferably, at maximum, five times, e.g. four times or twice.

Figure 3:
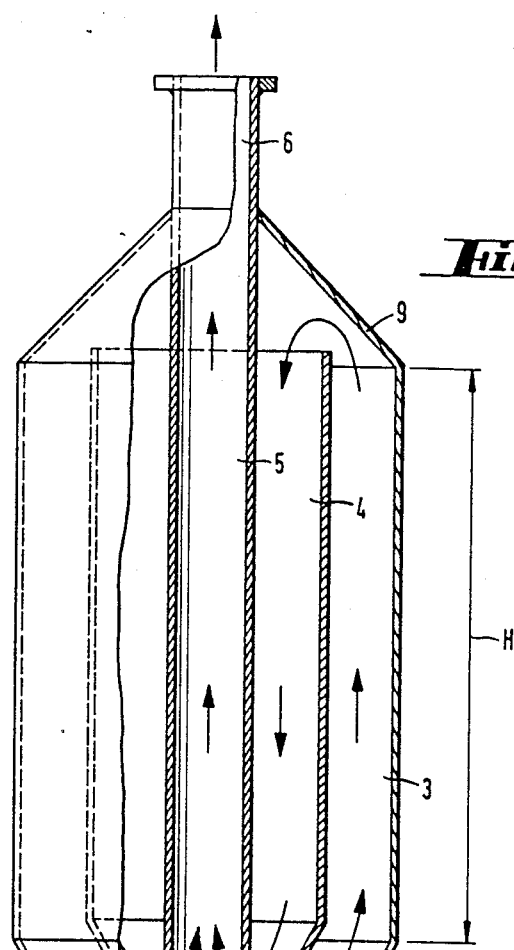
FIG. 3 depicts, partially in section, a side elevation of one preferred apparatus for carrying out the process according to the invention.
Figure 4:
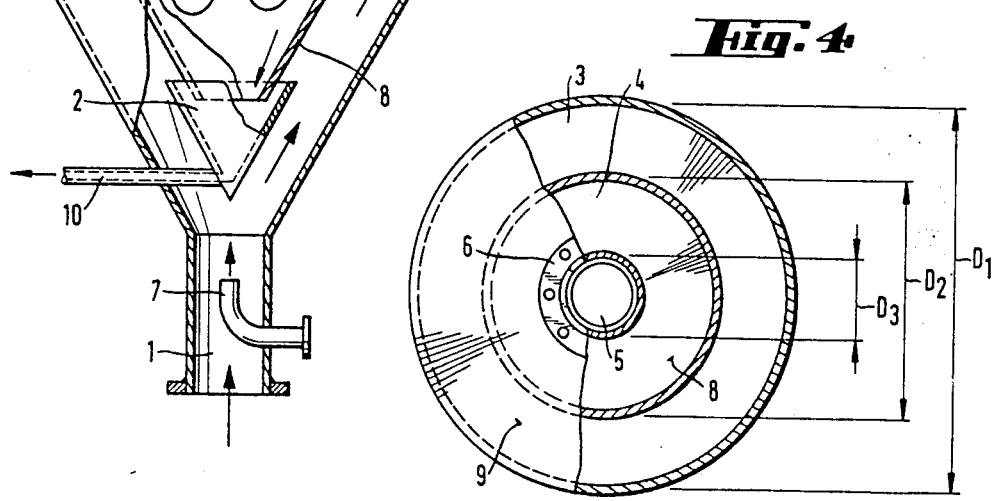
FIG. 4 depicts, half in section, a top view of the same apparatus.

FIGS. 3 and 4 show one especially advantageous cylindrical, vertical three-stage reactor, the height of which is substantially greater than its diameter and which is of a simple internal structure, for the carrying out of the process according to the invention.

The dust-bearing, flowing hot gas which contains gaseous trace element particles, usually impurities, enters the reactor preferably via an inlet unit 1 constructed in its lower section. The entering gas flow is distributed by the dividing cone 2 evenly into the outermost vertical annular zone 3 of the reactor, the height H of this zone being 4-40 m, preferably 6-30 m, and, after passing through it, the gas changes direction suddenly in order to produce turbulence and returns along an inner annular zone 4 of the reactor, lastly, after the flow has again changed direction, the gas flow ends up in the central pipe 5 of the reactor, along which the flowing gas flows out through the outlet unit 6 of the apparatus. This unit 6 is located preferably opposite to the inlet unit 1, and is thus in the upper section of the reactor.

It is self-evident that the number of stages in the apparatus may also be something other than three, preferably an odd number and at least two.

Close to the inlet unit of the apparatus there is a point 7 for feeding in water, in which case the different phases (gas, dust, water drops) have time to form a pseudohomogenous mixture before arriving at the gas-dividing cone 2.

It is also typical of the apparatus that between the lower dividing cone 2 and the truncated intermediate cone 8 above it there is a narrow opening resembling an annular groove, from which the water drops which have possibly separated from the gas flow between the second 4 and the third 5 reaction stages in the apparatus can leave without clogging the reaction section of the apparatus itself. The recovery of these separated drops is carried out by means of an outlet pipe 10 connected to the lower section of the dividing cone 2 of the apparatus and extending to the outside of the reactor. Furthermore, the diameter of the lower section of the intermediate cone 8 is smaller than the diameter of the upper section of the dividing cone 2, and the lower surface of the cone 8 is below the upper surface of the cone 2. This structural solution almost totally prevents the gas from flowing past the first 3 or the second 4 reaction stage.

In the currently-known absorption apparatuses it is usual that the diameter of the apparatus be constant over the entire length of the reaction pipe. In this case, there occur no substantial changes in the state of turbulence of the flows, and the effectiveness of absorption in the system weakens drastically as the state of equilibrium is approached. Turbulence tends even to decrease in the reactor when the material which absorbs the impurities of the hot gas is an aqueous liquid which, when vaporizing, binds the energy of the gas, thereby lowering its temperature and also its linear flow velocity, since the volume decrease caused by the temperature is greater than the volume increase caused by the vaporized water.

The technical efficiency of the apparatus developed for carrying out the method according to the invention is based on the concept that the mean linear flow velocity $v_s$ of the gas is always increased when shifting from one reactor stage to another. This velocity increase is sudden and always takes place in the vicinity of the reactor ends, the gas at the same time being forced to reverse its flow direction. A sudden increase of velocity implemented simultaneously with the reversal of the flow direction causes a drastic change in the state of turbulence and a remixing of the pseudohomogenous material, whereupon the so-called micro-level film surfaces in the absorption zone are renewed exceptionally rapidly and enhance absorption.

The stepwise increase of velocity towards the end of the reactor increases the microturbulence of the flowing gas as the Reynolds number Re increases. This happens when the effect of the increase of the linear velocity is greater than the effect of the decrease of the pipe diameter on the Re number. It is known that this will result in an improvement of the material transfer coefficient at the end of the reactor, where a weakening of efficiency, caused by the concentration difference decreasing at the final stage of the absorption, can be in part compensated for, and thus the efficiency of the apparatus according to the invention is higher than that of the apparatus according to the state of the art.

By causing turbulence locally in the reactor, the objective is to cause the water droplets and the absorbent particles to physically encounter one another, i.e. to impinge upon one another. Downstream of impingement caused by turbulence, the slurry formed on the wetted particles as the absorbent dissolves in the water, reacts with the reactant (e.g. sulfur constituents) contained in the hot gas stream. After each episode of turbulence, the flow becoming smooth, the remaining droplets of water and particles of absorbent resume movement in the same direction, thus limiting further impingement and reaction. The process of reaction is caused to progress further by providing more than one episode of turbulence.

Although the example of this embodiment of the invention has been absorption, it is self-evident that the process according to the invention can just as well be applied to the implementation of other corresponding unit operations, such as adsorption and even desorption.

Likewise, the chemicals participating in the transfer of material can be highly varied. The only condition is an at least partial dissolving of the solid and the gas in the water which forms a film.

In the various reaction stages of the apparatus the mean linear flow velocity of the gas must increase in steps as the gas passes through the apparatus. It is advantageous to implement this velocity increase in a geometrical series.

For example, in the embodiment described, when the linear flow velocity increases R-fold between the first 3 and the third 5 reaction zones, and if the velocity increase precisely follows a geometrical series, the diameters $D_i$ of the reaction tubes are, given in relative values, exactly as follows:

$$D_2/D_1 = \sqrt{(1+\sqrt{R})/(1+\sqrt{R}+R)}$$

$$D_3/D_1 = \sqrt{1/(1+\sqrt{R}+R)}$$

If the main diameter of the apparatus and the total velocity increase ratio R are selected so that the gas flow velocity $v_s$ in the reactor is $3 < v_s < 30$ m/s, and that the height of the cylindrical part of the apparatus is 1.5 times its diameter, the pressure loss of the gas in the apparatus will not be a factor restricting the design even if the allowed pressure loss is small. This is due to the spacious structure of the reactor. This factor is of great importance in the handling of many industrial outlet gases. The pressure loss in the reactor is in general 200-1200 Pa, preferably 300-600 Pa.

There is some leeway in the selection of the outer diameter $D_1$ of the reactor and the gas flow velocity ratio change R. The exact selection of these values is carried out according to the local conditions.

The invention is described below in greater detail with the help of the following examples:

EXAMPLE 1

EFFECT OF THE ADDITION OF WATER

When the flue gases of a power plant boiler contained $SO_2$ 900 ppm and the $CaO/SO_2$ ratio used was 2.0, the sulfur absorption rate without an addition of water was 30%. When, in otherwise corresponding conditions, water was added in an amount 90% of the theoretical amount mentioned in the description of the process, the total sulfur absorption rate increased to 70%. When the addition of water was raised to 98% of the theoretical amount, the absorption rate for sulfur dioxide was as high as 83%. The temperature of the water added was 15° C.

EXAMPLE 2

HEIGHT OF THE EVAPORATION STAGE AND THE DROP DIAMETER

It was observed that, when the velocity of rising gas in the system was 4 m/s and its inlet temperature was 140° C, the necessary travel distance for evaporation was 4 m for drops having a diameter of 70 μm and, under the corresponding conditions, it was as long as 40 m for drops having a diameter of 200 μm, before the wet temperature was reached. In both cases the relative evaporated amount of water was the same.

Example 3

EFFECT OF THE HEAT OF REACTION

When a gas totally devoid of $SO_2$ was fed into the reactor and the gas was cooled with pure water, in which case there were no heats of reaction, the wet temperature of the gas proved to be 57° C. When, in the corresponding conditions, the gases contained sulfur dioxide 2100 ppm and CaO was added to the absorption of sulfur dioxide so that the molar proportion $CaO/SO_2$ was 2.0, after the feeding in of the same amount of water the post-process temperature was 84° C. Before the main stage of the reactions the minimum temperature was 70° C.

EXAMPLE 4

PRESSURE LOSS

In two reactors of different structures a change in pressure loss was produced by means of various structures. When the structure was such that no significant losses of pressure were produced, 5% of a gas containing $SO_2$ 1000 ppm was absorbed when the pressure loss was 30 Pa. In another reactor, in which the conditions and the retention time were the same but the pressure loss was increased to 340 Pa by means of turbulence-causing throttling and curves, the sulfur absorption rate rose to 70%. In this case the reactor had two separate sudden throttlings in series, the direction of the flow being simultaneously changed in these throttlings so that the flow velocity increased by the end of the reactor to a value four times that in the beginning.

EXAMPLE 5

NARROWING OF THE INLET

Into a reactor in which the inlet had been narrowed, gas was fed at a flow velocity of 9 m/s, whereupon the drops which had agglomerated on the walls flowed down and were able to flow out into the reactor gas inlet pipe. When the flow velocity was raised to a value of 14 m/s, the lower section of the reactor remained totally dry during a long period of time.

We claim:

1. A process for removing a constituent from a hot gas stream by exothermic ionic reaction of the constituent with a reactant provided in fine particulate form, comprising the steps of:
   (a) providing a flowing hot gas stream containing, in fine particulate form, a reactant capable of reacting with a constituent of the hot gas stream in an exothermic ionic reaction;
   (b) while directing the flowing hot gas stream upwardly, introducing droplets of water thereinto so that the water droplets, while being borne upwardly in the hot gas stream, evaporate in major proportion, thereby coating said particulate reactant and humidifying the flowing hot gas stream, and thereby providing a flowing cooled and humidified gas stream;
   (c) subjecting the cooled and humidified gas stream to a plurality of episodes of turbulence, each successive two of said episodes of turbulence being separated by a respective interval of substantially laminar, vertical flow and thereafter vertical downward laminar flow thereby causing said reactant in fine particulate form and water droplets remaining after partial evaporation as a result of step (b), to impinge upon one another thereby producing in said cooled and humidified gas stream, aqueous film-covered particles of said reactant, in which film an exothermic ionic reaction proceeds between said constituent and said reactant, at least one of said episodes of turbulence being caused by abruptly reversing flow direction of said flowing gas stream;
   (d) directing the resulting gas stream to flow in continued contact with said aqueous film-covered particles, whereby heat of reaction from said exothermic ionic reaction evaporates said aqueous film into said gas stream, whereby chemically reacted particles in which said constituent have been consumed may be removed from the gas stream for purifying the gas stream of said constituent; and
   (e) recovering said chemically reacted particles from the gas stream.

2. The process of claim 1, wherein:
said hot gas stream is a power plant boiler flue gas, said constituent is sulfur in $SO_2$, and said reactant is CaO.

3. The process of claim 1, further comprising:
at an upstream portion of step (b), throttling the upwardly flowing, water droplet-containing hot gas stream for raising flow velocity and thereby causing larger water droplets falling therein to tend to break into smaller, upwardly-flowing water droplets.

4. The process of claim 1, wherein:
in step (b), from 20 to 100 grams of water per cubic meter of hot gas are introduced into said hot gas stream.

5. The process of claim 1, wherein:
said flowing hot gas stream has an inlet temperature in the range of 80°-250° C.

6. The process of claim 5, wherein:
said inlet temperature is 125°-180° C.

7. The process of claim 1, wherein:
the water droplets introduced in step (b) have diameters in the range of 30-200μm.

8. The process of claim 7, wherein:
said water droplets introduced in step (b) have maximum diameters of 70 μm.

9. The process of claim 8, wherein:
said water droplets, as introduced into said hot gas stream, have a maximum temperature of about 40° C.

10. The process of claim 9, wherein:
said maximum temperature is 15° C.

11. The process of claim 1, wherein:
said hot gas stream, when flowing upwardly in step (b) to encounter the water droplets being introduced, has an upward velocity in the range of 10-20 m/s.

12. The process of claim 11, wherein:
said hot gas stream upward flow velocity is in the range of 12-16 m/s.

13. The process of claim 11, wherein:
said hot gas stream having said water droplets therein and being borne upwardly, has an upward flow velocity in the range of 3-30 m/s.

14. The process of claim 13, in which:
said hot gas stream upward velocity upstream of the introduction of water droplets is n the range of 12–16 m/s, and downstream of the introduction of water droplets is in the range of 4–15 m/s.

15. The process of claim 1, wherein:

said flowing hot gas stream has an inlet temperature in the range of 80–250 °C.;

the water droplets introduced in step (b) have diameters in the range of 30–200 μm;

said hot gas stream, when flowing upwardly in step (b) to encounter the water droplets being introduced, has an upward velocity in the range of 10–20 m/s;

said hot gas stream having said water droplets therein and being borne upwardly, has an upward flow velocity in the range of 3–30 m/s; and in step (b), from 20 to 100 grams of water per cubic meter of hot gas are introduced into said hot gas stream.

16. The process of claim 15, wherein:

said hot gas stream is a power plant boiler flue gas, said constituent is sulfur in $SO_2$, and said reactant is CaO.

* * * * *